(12) United States Patent
Rudraswamy

(10) Patent No.: US 10,988,245 B2
(45) Date of Patent: Apr. 27, 2021

(54) SEGMENTED DUCT FOR TILTING PROPROTORS

(71) Applicant: Bell Helicopter Textron Inc., Fort Worth, TX (US)

(72) Inventor: Chandrashekar Rudraswamy, Bengaluru (IN)

(73) Assignee: Bell Textron Inc., Fort Worth, TX (US)

( * ) Notice: Subject to any disclaimer, the term of this patent is extended or adjusted under 35 U.S.C. 154(b) by 381 days.

(21) Appl. No.: 15/811,002

(22) Filed: Nov. 13, 2017

(65) Prior Publication Data

US 2019/0144107 A1 May 16, 2019

(51) Int. Cl.
| | |
|---|---|
| *B64C 27/52* | (2006.01) |
| *B64C 29/00* | (2006.01) |
| *B64C 27/26* | (2006.01) |
| *B64C 27/28* | (2006.01) |
| *B64C 11/00* | (2006.01) |
| *B64C 3/32* | (2006.01) |

(52) U.S. Cl.
CPC ............ *B64C 27/52* (2013.01); *B64C 11/001* (2013.01); *B64C 27/26* (2013.01); *B64C 27/28* (2013.01); *B64C 29/0033* (2013.01); *B64C 3/32* (2013.01)

(58) Field of Classification Search
CPC ......... B64C 27/52; B64C 27/26; B64C 27/28; B64C 11/001
See application file for complete search history.

(56) References Cited

U.S. PATENT DOCUMENTS

| | | | |
|---|---|---|---|
| 2,876,965 A | * | 3/1959 | Streib ..................... B64C 39/06 244/12.2 |
| 5,046,684 A | | 9/1991 | Wolkovitch |
| 5,383,627 A | * | 1/1995 | Bundo ...................... B64B 1/02 244/25 |
| 7,520,466 B2 | | 4/2009 | Bostan |
| 7,658,346 B2 | | 2/2010 | Goossen |
| 8,777,150 B2 | | 7/2014 | Wang |

(Continued)

FOREIGN PATENT DOCUMENTS

| | | | |
|---|---|---|---|
| CN | 105173074 A | | 12/2015 |
| EP | 2551193 | * | 1/2013 |

(Continued)

OTHER PUBLICATIONS

European exam report in related European Patent Application No. 18150905.0, dated Mar. 6, 2019, 4 pages.

(Continued)

*Primary Examiner* — Justin M Benedik
(74) *Attorney, Agent, or Firm* — Lightfoot & Alford PLLC

(57) ABSTRACT

A tiltrotor assembly has a central hub with a plurality of rotor blades extending therefrom and is configured to rotate about a mast axis to generate lift in a hover position. The central hub is configured to rotate about a tilt axis between the hover position and a forward-flight position such that rotation about the mast axis generates forward thrust. The central hub is surrounded by a segmented duct that includes a thin rotatable inner ring and a wide fixed outer ring. The inner ring is configured to rotate with the central hub about the tilt axis leaving the wide outer ring in a generally horizontal position.

20 Claims, 12 Drawing Sheets

(56) References Cited

U.S. PATENT DOCUMENTS

2006/0226281 A1* 10/2006 Walton ................... B64C 27/20
                                                                244/17.23
2007/0215748 A1*  9/2007 Robbins ................ B64C 39/024
                                                                244/12.5
2007/0272796 A1   11/2007 Stuhr

FOREIGN PATENT DOCUMENTS

EP       2551193 A1    1/2013
WO    2004065208 A2    8/2004
WO    2007110833 A1   10/2007
WO    2015019255 A1    2/2015

OTHER PUBLICATIONS

European Search Report in related European Patent Application No. 18150905.0, dated Jul. 2, 2018, 5 pages.
European exam report in related European Patent Application No. 18150905.0, dated Jul. 16, 2018, 7 pages.

* cited by examiner

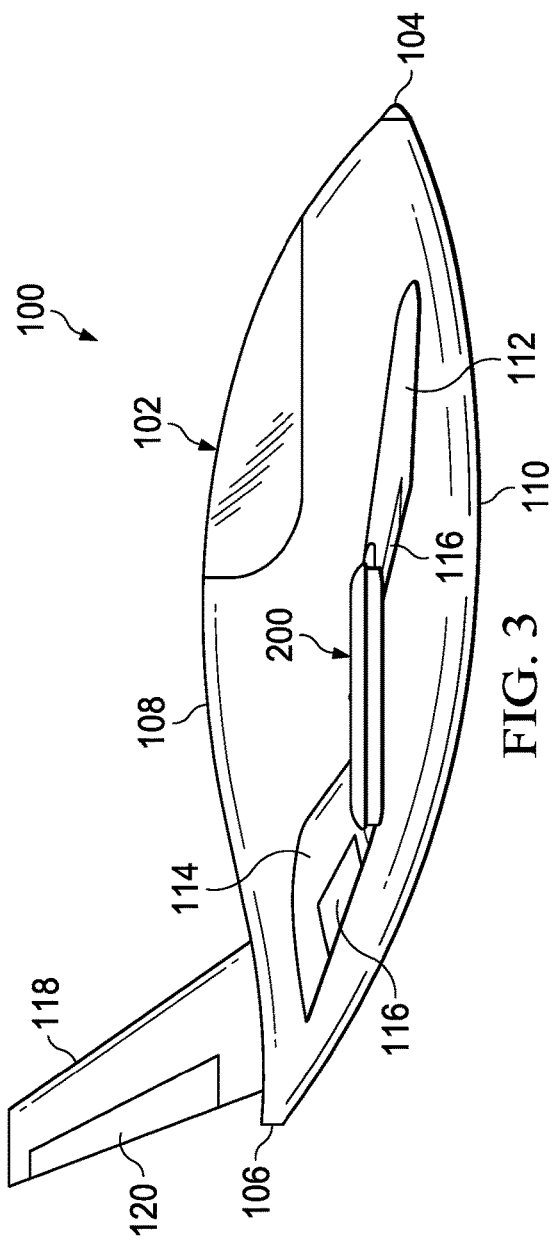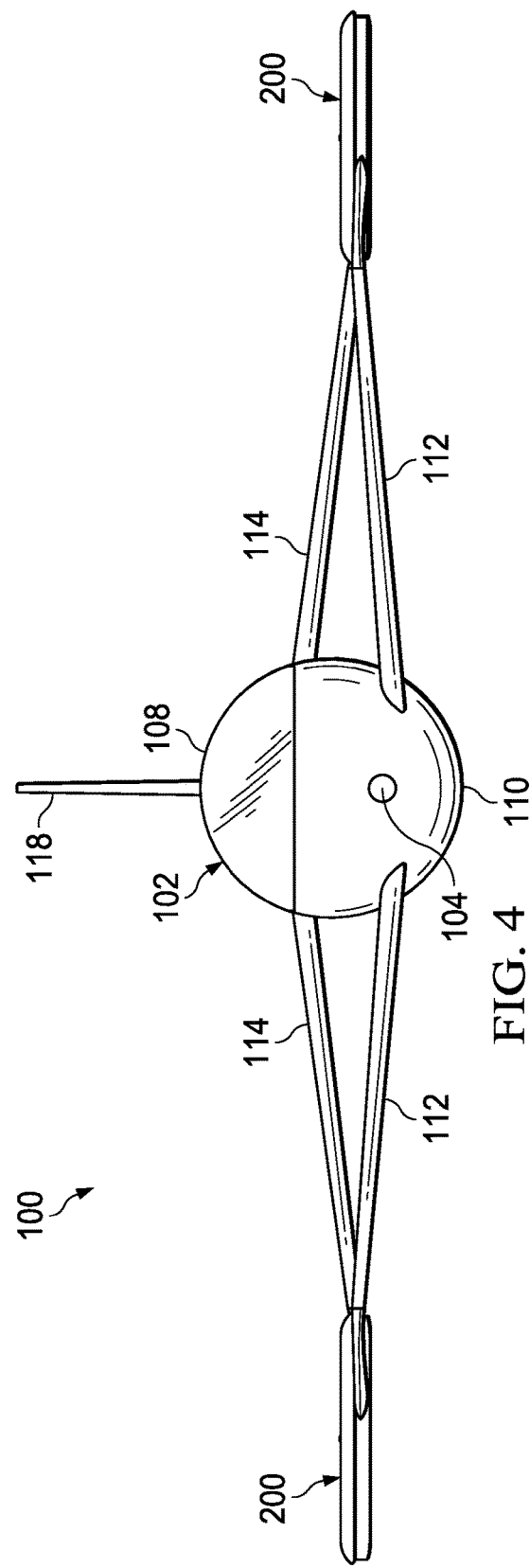

SEGMENTED DUCT FOR TILTING PROPROTORS

BACKGROUND

Ducted rotors on a rotor-driven vertical take-off and landing ("VTOL") aircraft can greatly increase the hover efficiency of the aircraft. This increased efficiency is due to Bernoulli's principle; as the air accelerates across the wide rim of the duct toward the rotor blades, the increased velocity of the air causes a decrease in the pressure of the air above the duct surface, creating lift on the surface. A wide duct rim acts as a lifting annular wing in hover mode. However, ducted rotors are rarely used on helicopters because helicopter rotors are very large and would require an enormous, and therefore heavy, duct. In addition, there is no straightforward way to attach a duct around the main rotor on a helicopter.

Tiltrotor aircraft rely on smaller diameter, highly loaded rotors that are more amenable to utilizing a duct. Tiltrotor aircraft generally have two proprotors positioned at the ends of a fixed wing. The proprotors are positioned with the rotor blades in a generally horizontal orientation for a hover, or helicopter, mode, and they are positioned with the rotor blades in a generally vertical orientation for a forward-flight, or airplane, mode. The proprotors on a tiltrotor aircraft generally have a smaller rotor disc area (with higher installed power) than the main rotor on a comparably-sized helicopter. Thus, tiltrotor aircraft can utilize smaller ducts that would not be feasible on a similarly-sized helicopter. Even though tiltrotor aircraft would seem to be a good fit for ducted proprotors, tiltrotor aircraft are rarely fitted with ducted proprotors because the wide rim (needed to provide additional lift in hover mode) would cause considerable drag when the duct is rotated into forward-flight mode.

BRIEF DESCRIPTION OF THE DRAWINGS

FIG. 3 is a side view of the aircraft and one segmented duct of FIG. 1.

FIG. 4 is a front view of the aircraft and segmented ducts of FIG. 1.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure provides a segmented duct for tiltrotor assemblies and an aircraft for use thereon. The segmented duct includes a wide annular rim to provide additional lift in a hover position but only a portion of the rim rotates with the proprotor, thereby limiting additional drag in a forward-flight position. While the segmented duct is shown on a joined wing aircraft, the segmented ducts disclosed herein may be used on any tiltrotor aircraft.

Figure 1:
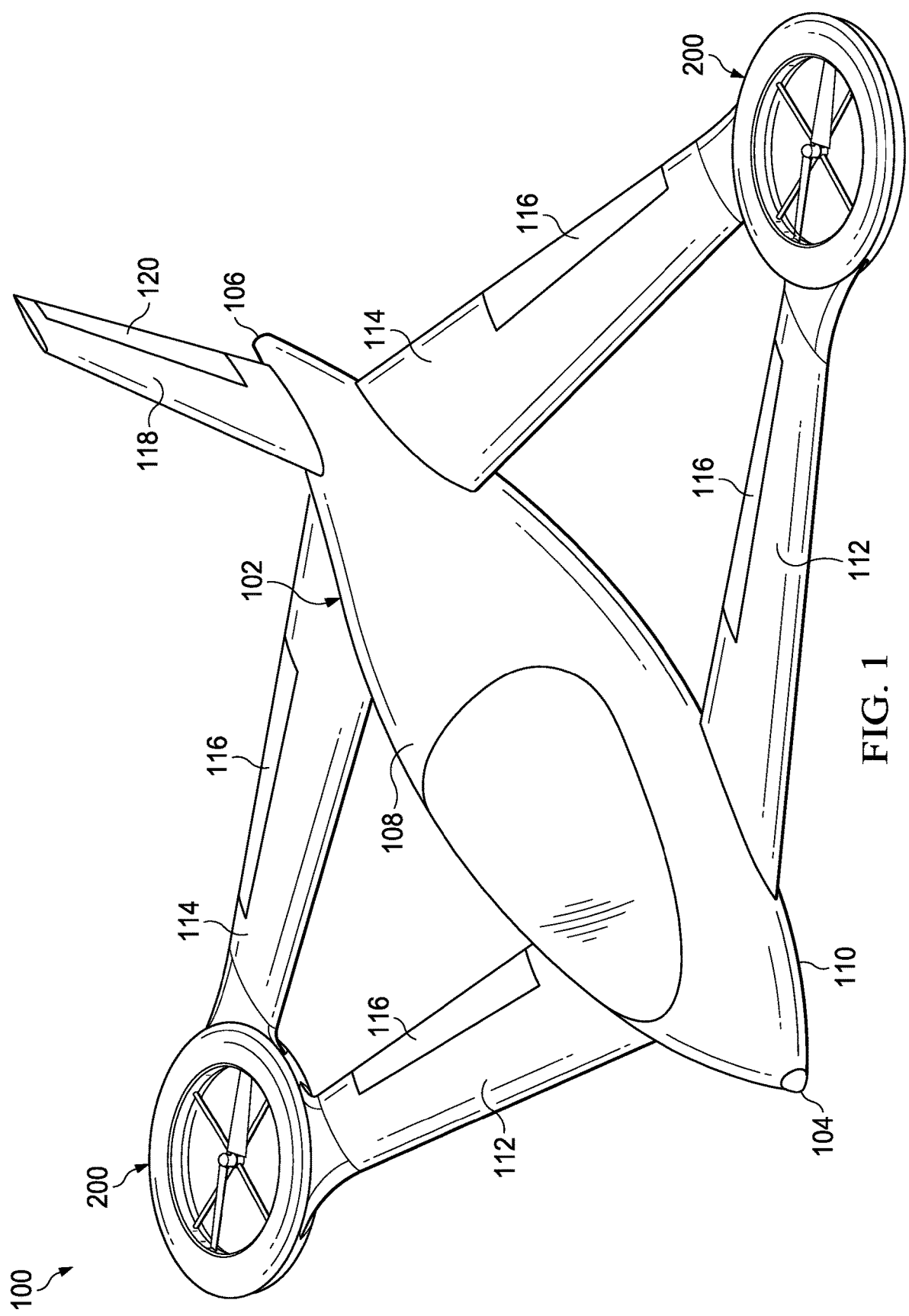
FIG. 1 is an oblique view of an aircraft including segmented ducts, according to this disclosure, shown in a hover mode.
Figure 2:
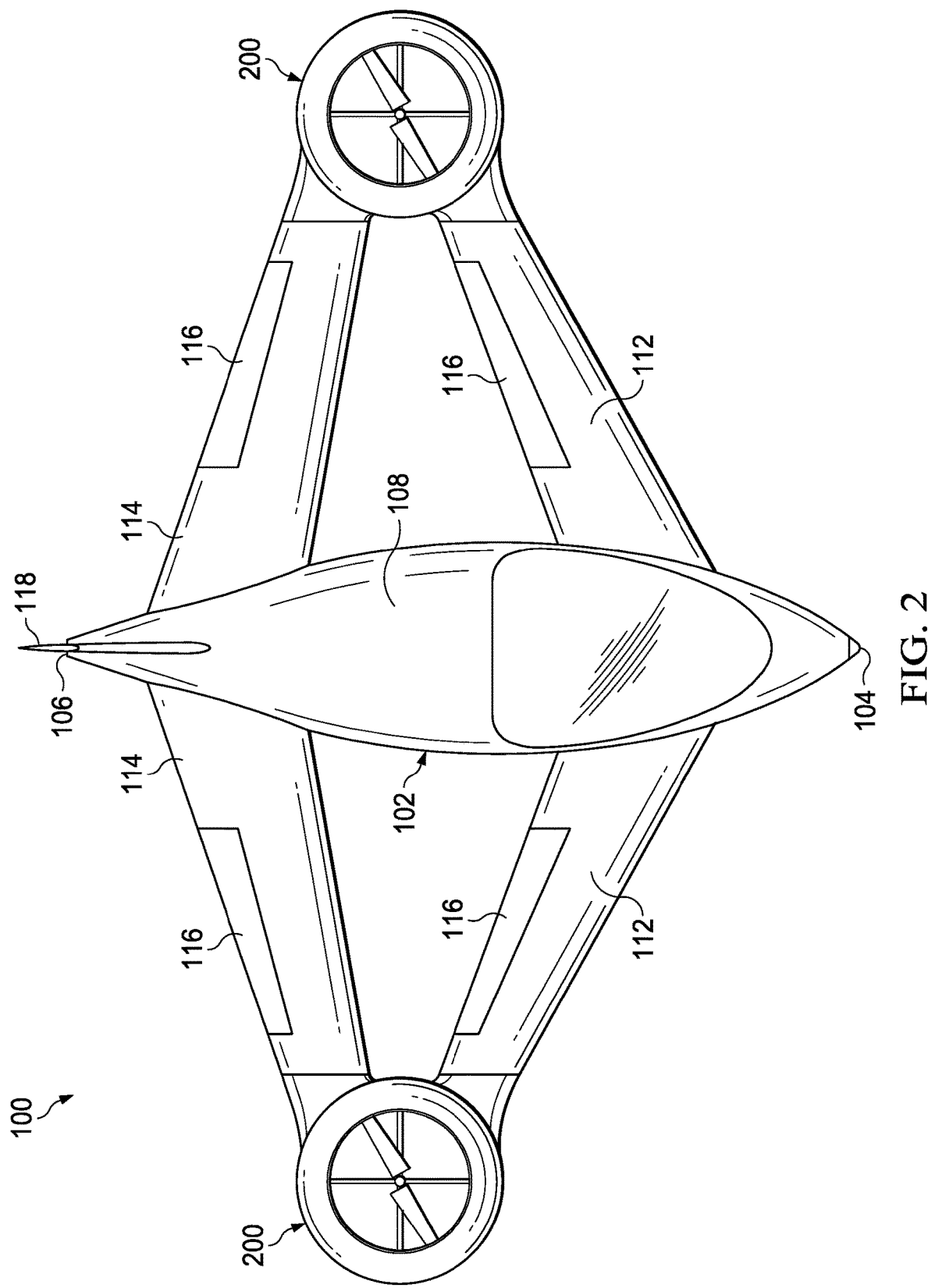
FIG. 2 is top view of the aircraft and segmented ducts of FIG. 1
Figure 5:
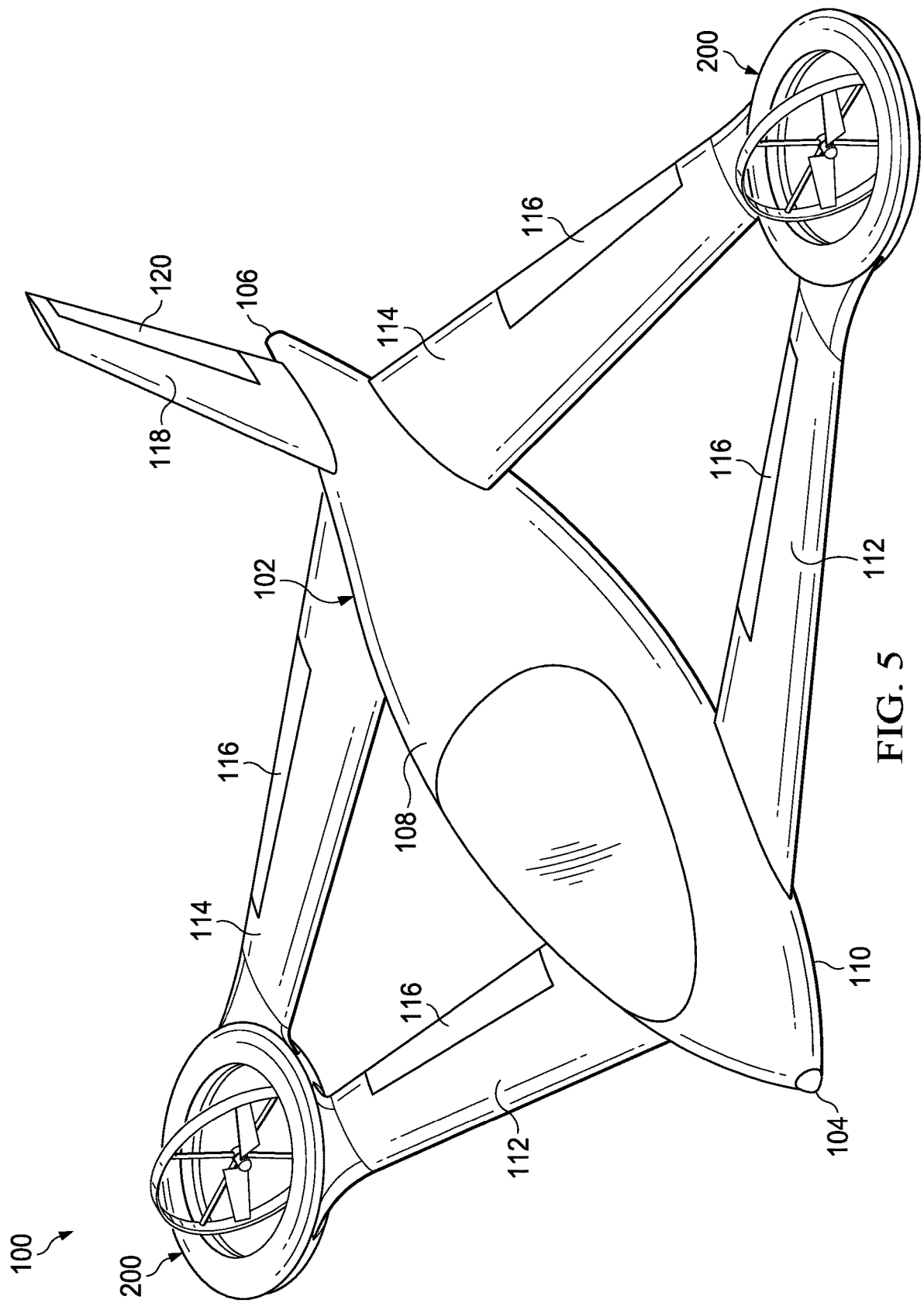
FIG. 5 is an oblique view of the aircraft and segmented ducts of FIG. 1 shown in forward-flight mode.
Figure 6:
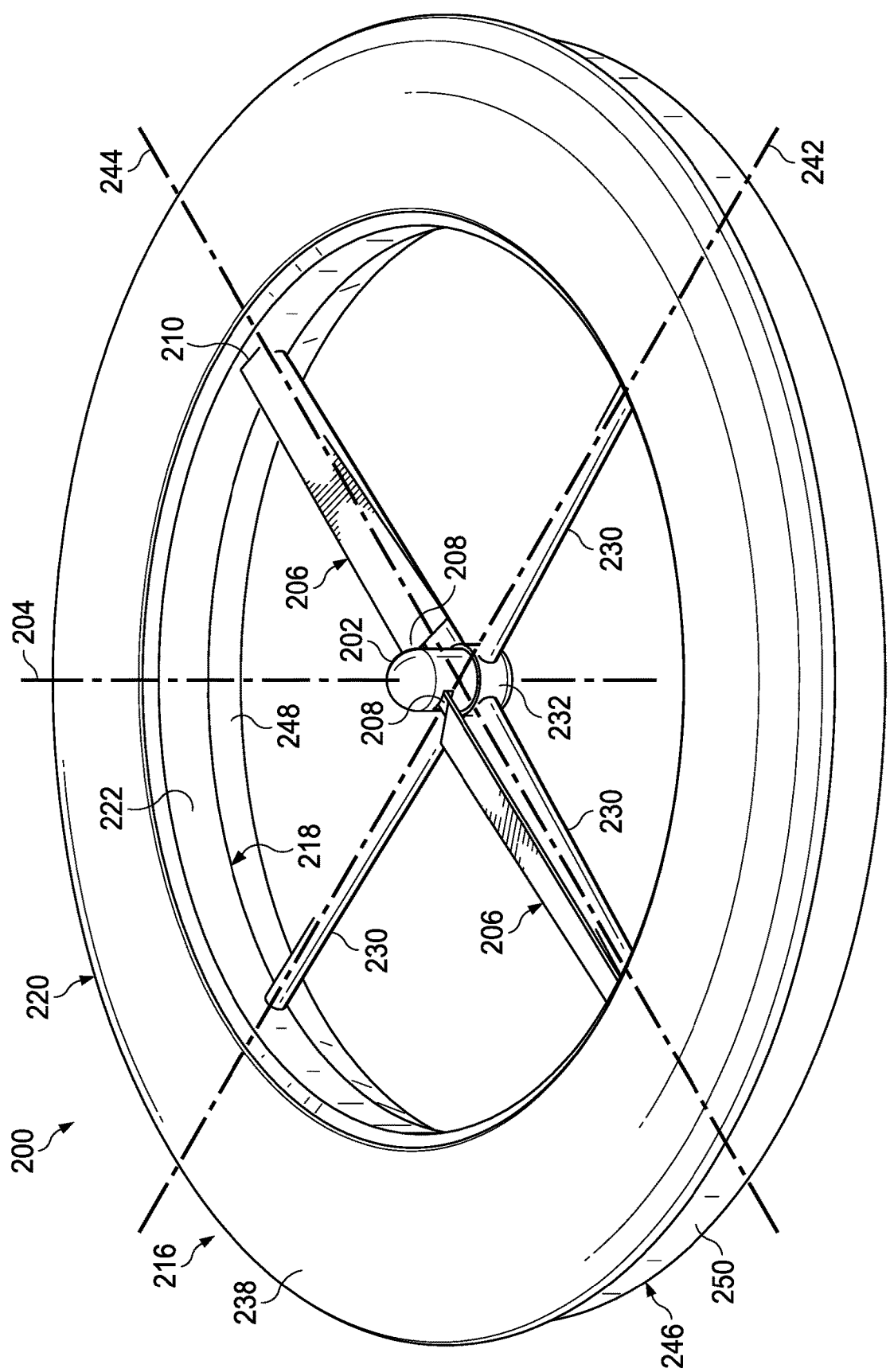
FIG. 6 is an oblique view of one of the segmented ducts of FIG. 1 shown in a hover position.
Figure 7:
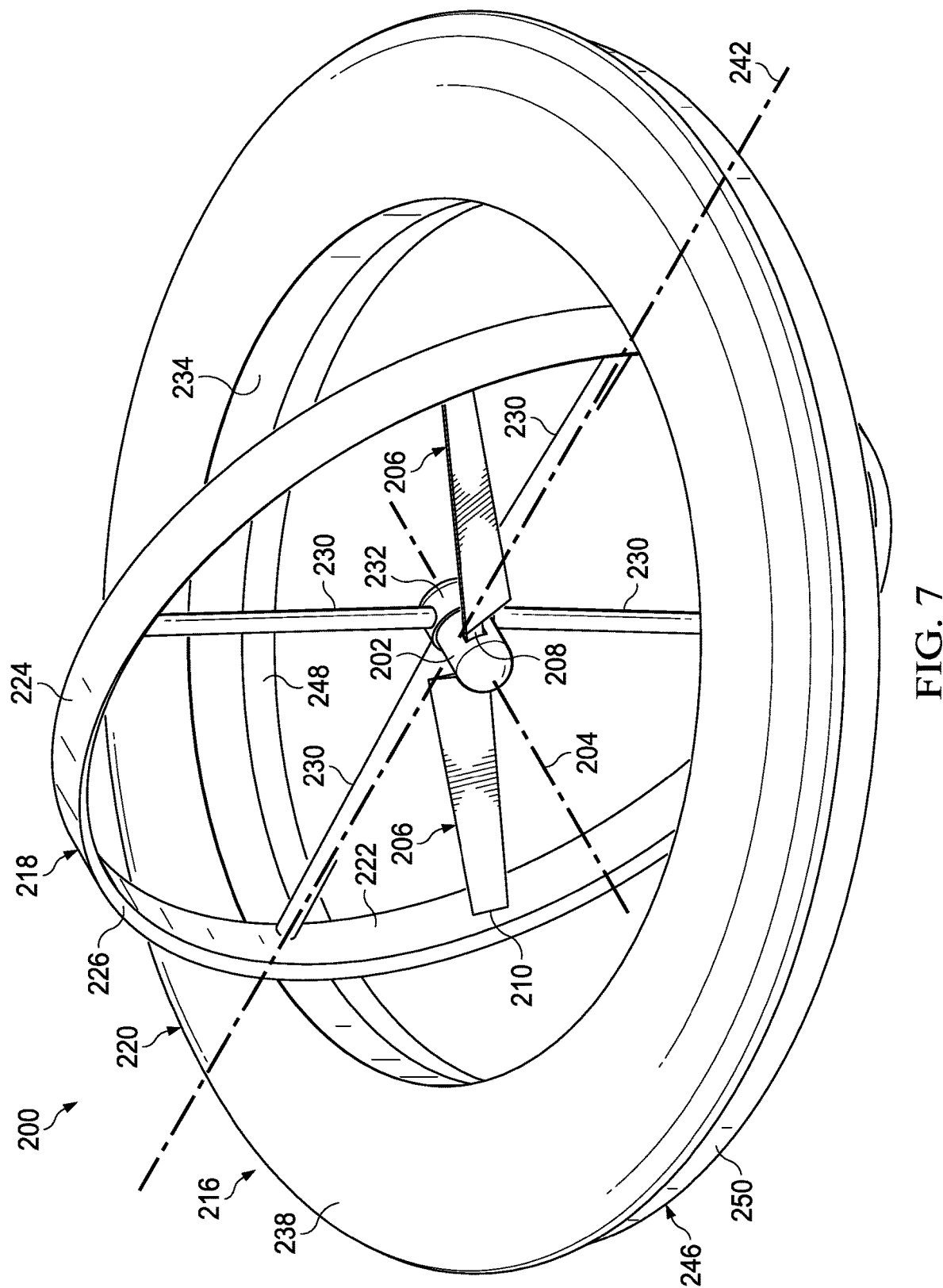
FIG. 7 is an oblique view of the segmented duct of FIG. 6 shown in a forward-flight position.
Figure 8:
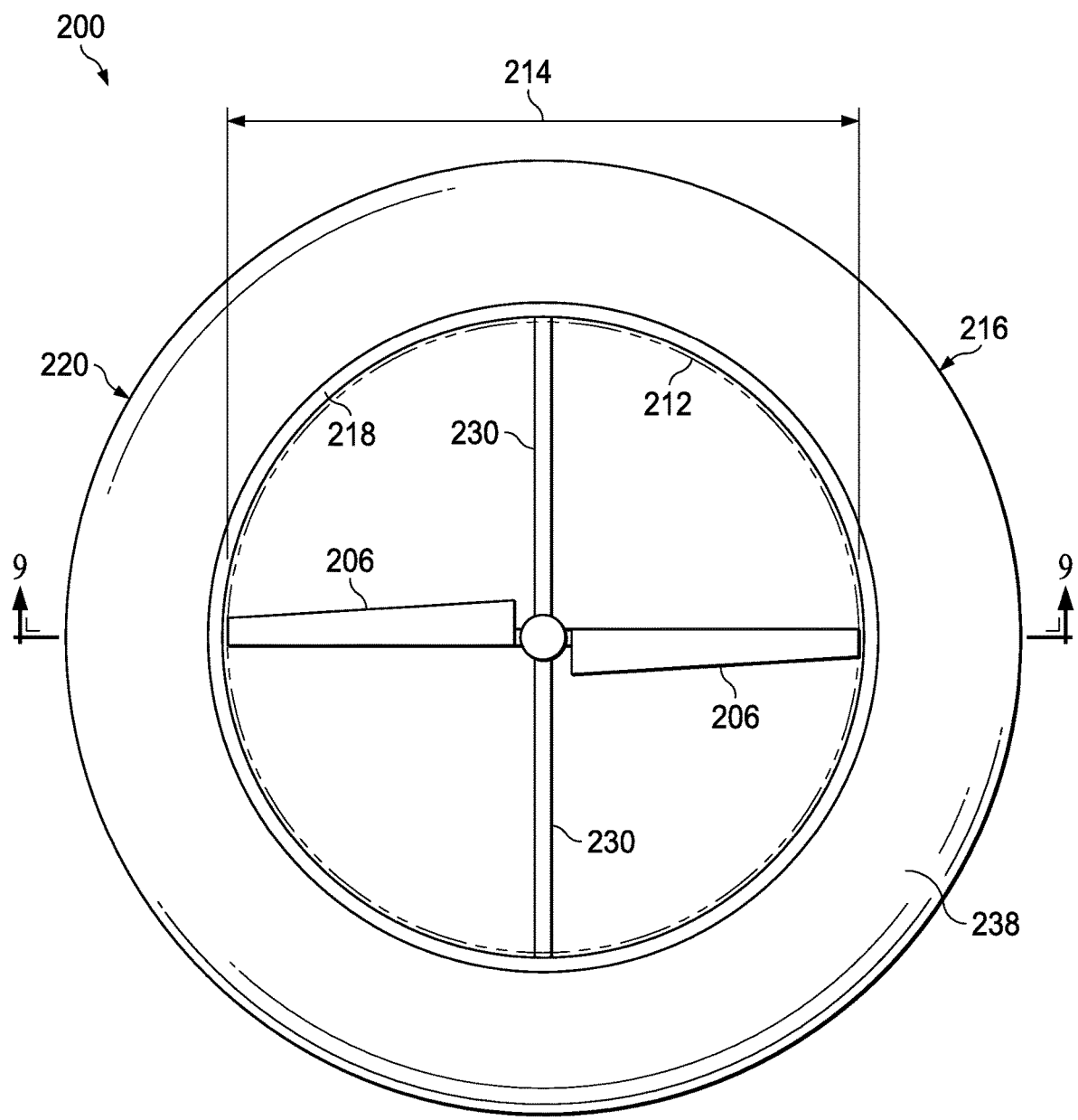
FIG. 8 is a top view of the segmented duct of FIG. 6.
Figure 9:
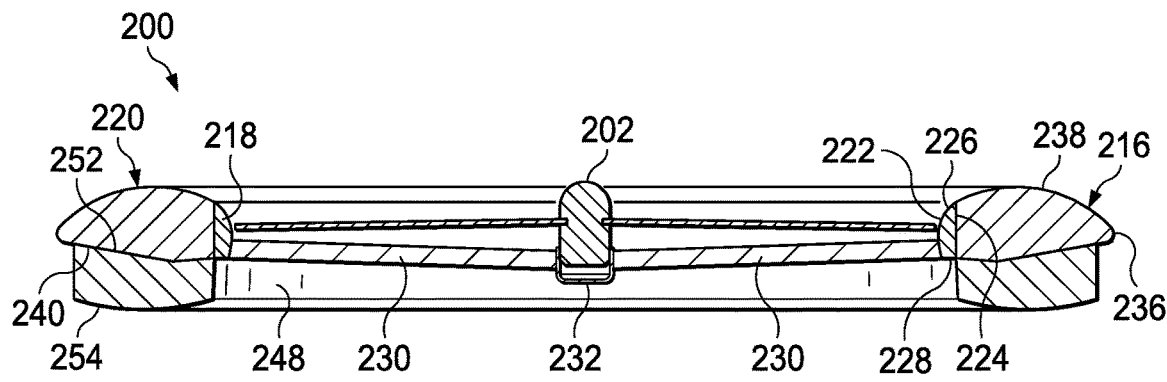
FIG. 9 is a cross-sectional side view of the segmented duct shown in FIG. 8.
Figure 10:
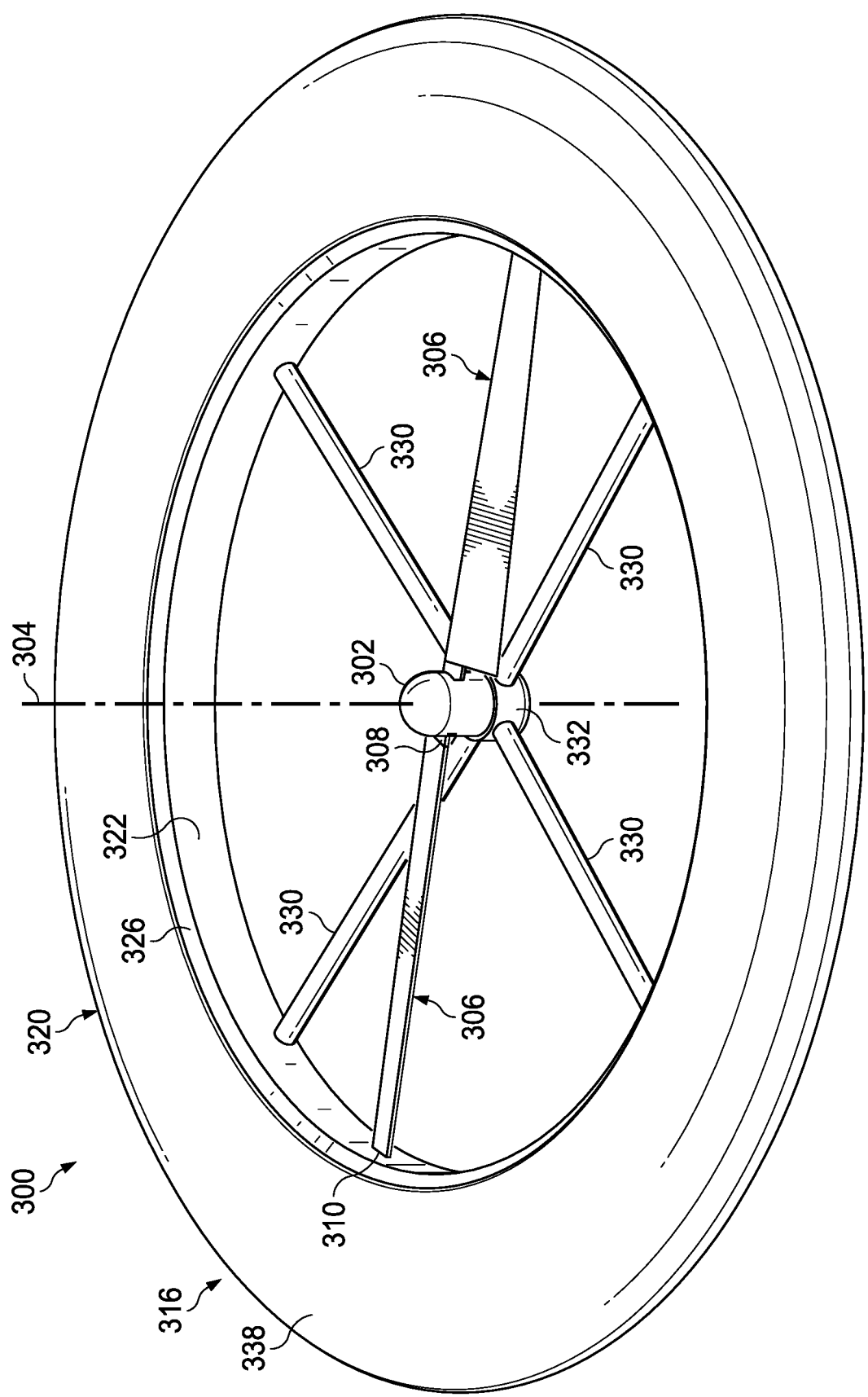
FIG. 10 is an oblique view of another embodiment of a segmented duct, according to this disclosure, shown in a hover position.
Figure 11:
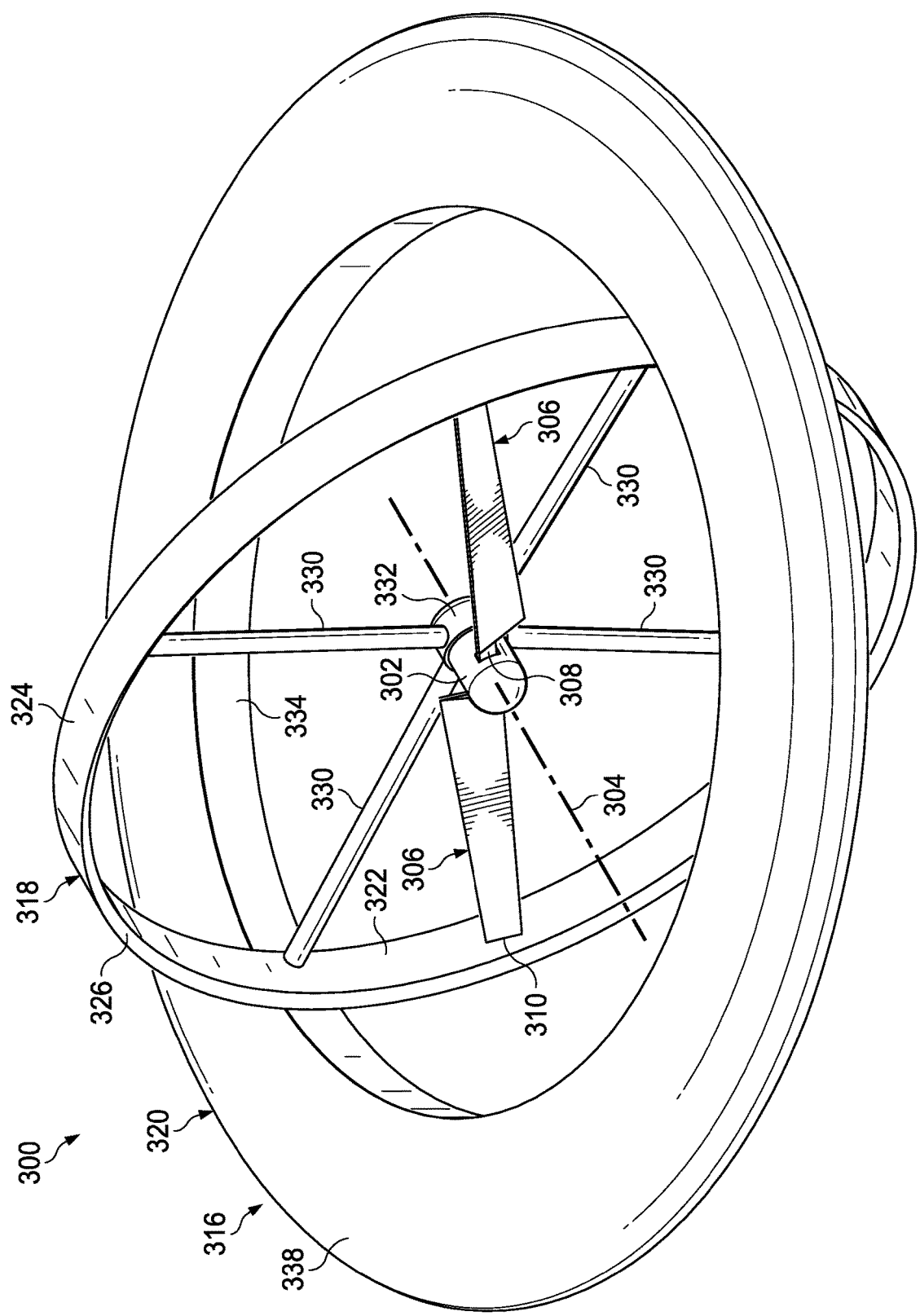
FIG. 11 is an oblique view of the segmented duct of FIG. 10 shown in a forward-flight position.
Figure 12:
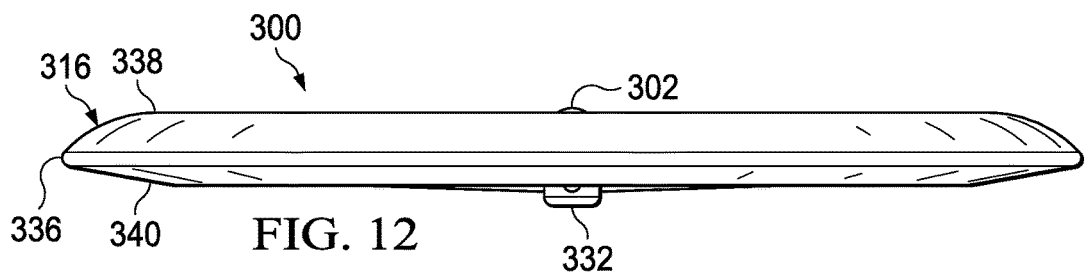
FIG. 12 is a side view of the segmented duct of FIG. 10.
Figure 13:
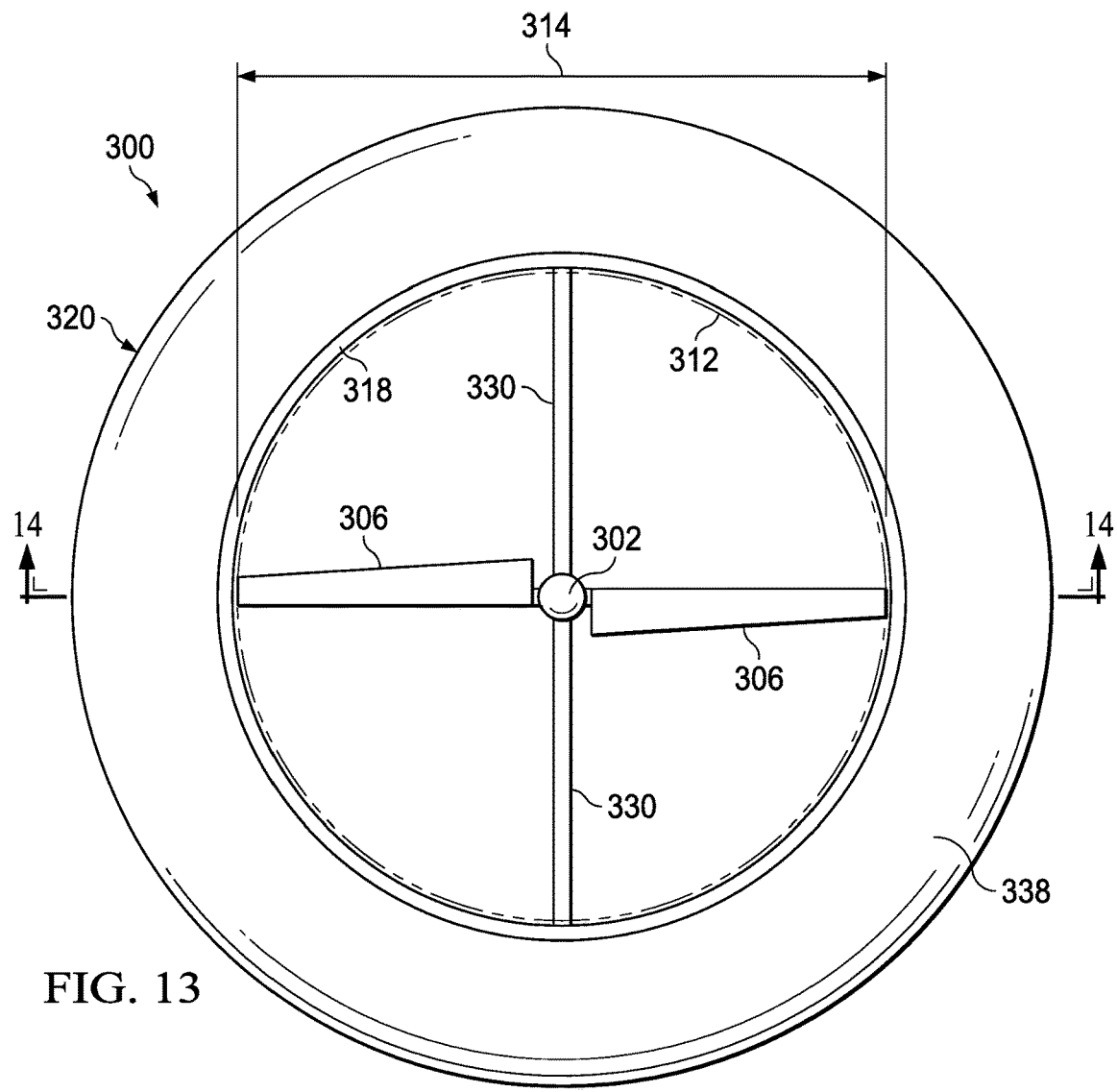
FIG. 13 is a top view of the segmented duct of FIG. 10.
Figure 14:
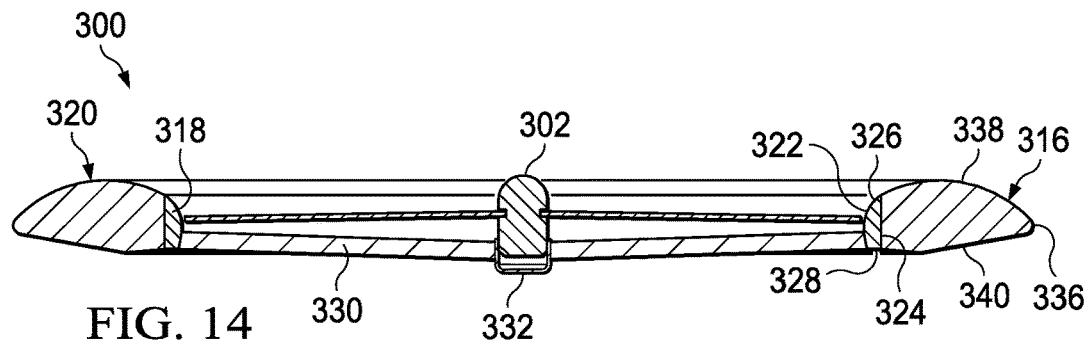
FIG. 14 is a cross-sectional side view of the segmented duct shown in FIG. 13.
Figure 15:
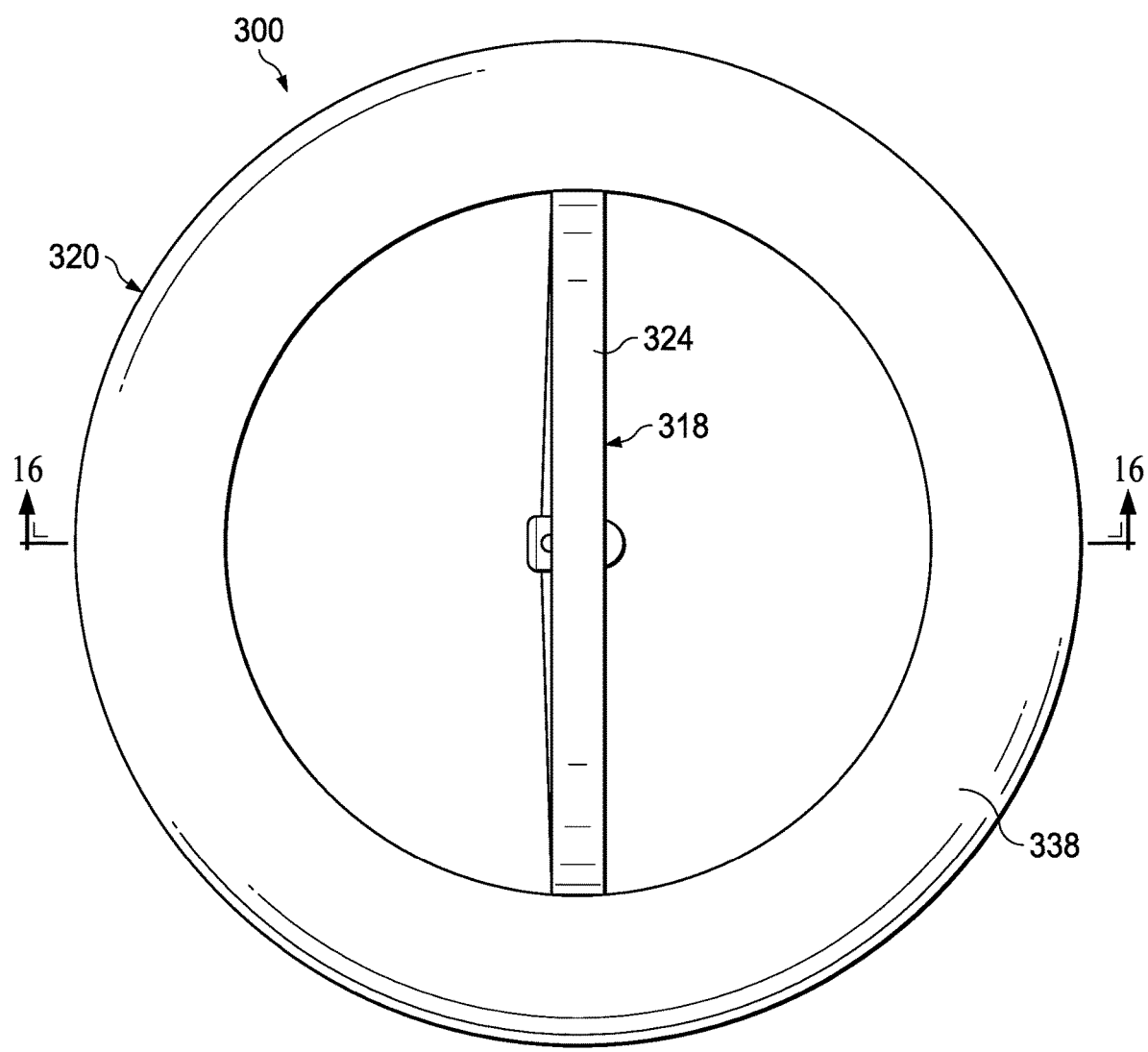
FIG. 15 is a top view of the segmented duct of FIG. 10 in the forward-flight position.
Figure 16:
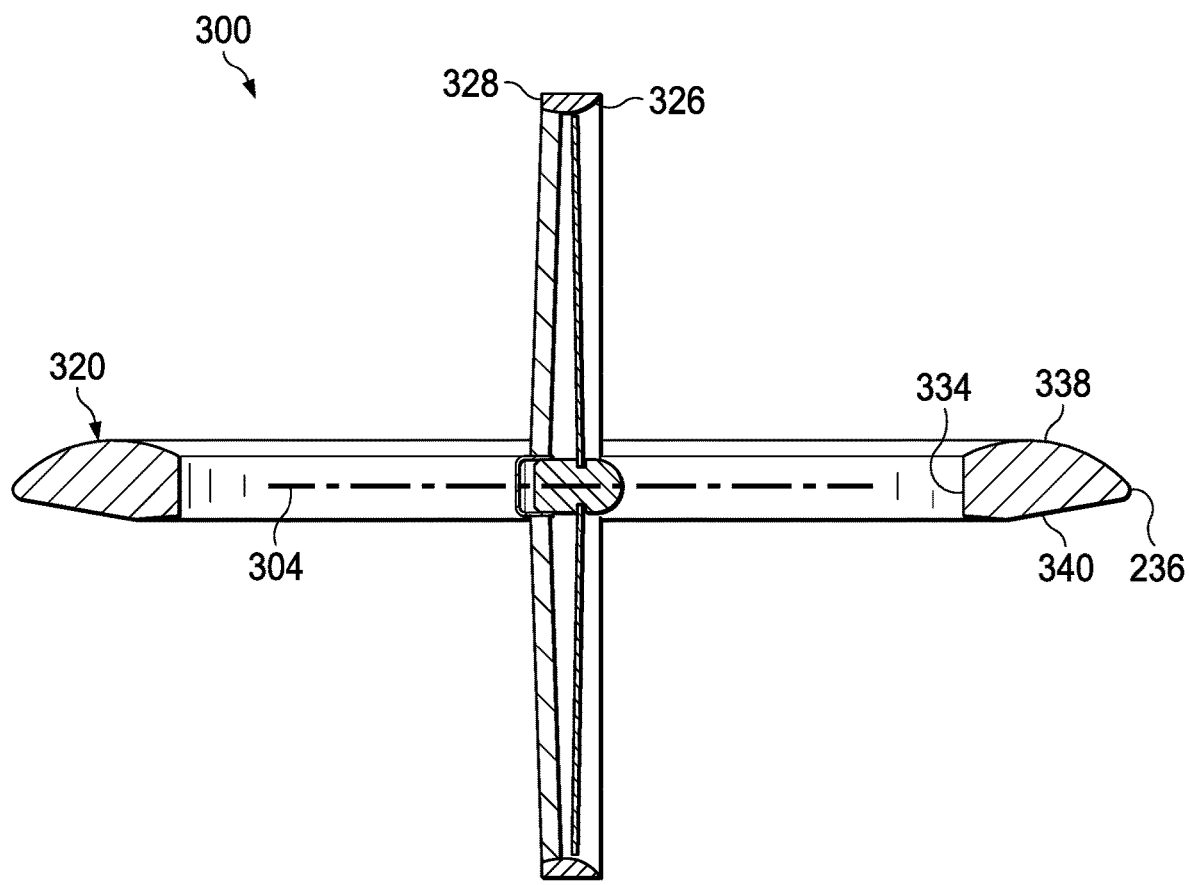
FIG. 16 is a cross-sectional side view of the segmented duct shown in FIG. 15.

FIGS. 1-5 illustrate an aircraft 100 with a pair of tiltrotor assemblies 200 that enable aircraft 100 to operate in a hover mode when tiltrotor assemblies 200 are in a generally horizontal configuration, referred to as a hover position (as shown in FIGS. 1-4), and in a forward-flight mode when tiltrotor assemblies 200 are in a generally vertical configuration, referred to as a forward-flight position (as shown in FIG. 5). Aircraft 100 includes a fuselage 102 with a front end 104, a rear end 106, a top portion 108, and a bottom portion 110. A first set of wings 112 that provide lift in forward-flight mode extend bilaterally from bottom portion 110 proximate front end 104. A second set of wings 114 that provide additional lift in forward-flight mode extend bilaterally from top portion 108 proximate rear end 106. First set of wings 112 are angled toward rear end 106 and second set of wings 114 are angled toward front end 104 such that the tips of first and second sets of wings 112, 114 join at tiltrotor assemblies 200. As such, aircraft 100 is configured as a negative stagger joined-wing aircraft suitable for use on aircraft ranging in size from unmanned micro air vehicles to medium transport aircraft having a velocity ranging from 0 knots (in hover mode) to low subsonic speeds. Joined-wing aircraft have been shown to have increased aerodynamic and structural weight efficiency compared to conventional fixed wing aircraft. The structural weight efficiency makes a joined wing configuration particularly advantageous for use on tiltrotor aircraft. However, while aircraft 100 is shown in this negative stagger joined-wing configuration, aircraft 100 could utilize a positive stagger joined-wing configuration or a conventional wing configuration. Moreover, tiltrotor assemblies 200 may be used on any aircraft that would benefit from vertical lift in one mode and propulsive thrust in another.

First and second sets of wings 112, 114 both include control surfaces 116 proximate the trailing ends thereof.

Control surfaces 116 may comprise flaps, ailerons, spoilers, or any combination thereof. Control surfaces 116 may be used to increase or decrease lift or drag, change pitch, or roll aircraft 100 while in forward-flight mode. A vertical tail fin 118 extends from top portion 108 proximate rear end 106. Vertical tail fin 118 includes a rudder 120 to affect yaw of aircraft 100. While aircraft 100 is shown with a single vertical tail fin 118, offer configurations may be utilized, for example, a V-tail, H-tail, inverted V-tail, T-tail, or any other possible configuration.

Aircraft 100 may be configured to operate solely utilizing electric motors to power the flight thereof. In such a configuration, tiltrotor assemblies 200 may be configured to capture regenerative energy.

Referring now to FIGS. 6-9, tiltrotor assembly 200 is illustrated. Tiltrotor assembly 200 includes a central hub 202 configured to rotate about a mast axis 204. Central hub 202 includes a pair of rotor blades 206 coupled thereto for common rotation therewith about mast axis 204. While tiltrotor assembly 200 is shown with two rotor blades 206, tiltrotor assembly 200 may include any number of rotor blades 206. Each rotor blade 206 includes a root 208 coupled to central hub 202 and a tip 210 opposite root 208. A path of rotation of tip 210 defines a rotor disc perimeter 212, rotor disc perimeter 212 has a rotor disc diameter 214. Rotor disc perimeter 212 is encircled by a segmented duct 216 having a generally elliptical torus shape. Segmented duct 216 is configured to improve the hover efficiency of tiltrotor assembly 200 by providing a wide upper surface across which air accelerates toward rotor blades 206. The accelerated air experiences a loss in pressure across the wide upper surface, generating lift, and thereby increasing the hover efficiency of tiltrotor assembly 200. Segmented duct 216 includes an inner ring 218 nested inside an outer ring 220. Inner ring 218 includes an inner surface 222 facing central hub 202, an opposite outer surface 224 facing outer ring 220, and a width measured between inner surface 222 and outer surface 224. Inner ring 218 further includes a top surface 226, an opposite bottom surface 228, and a height measured therebetween. Top surface 226 is preferably convex between inner surface 222 and outer surface 224. Outer surface 224 may be convex from top surface 226 to bottom surface 228, with a radius of curvature equal to a radius of inner ring 218.

Inner ring 218 is coupled to central hub 202 via four hub support members 230. Hub support members 230 extend from inner surface 222 of inner ring 218 to a central hub case 232. Central hub case 232 secures central hub 202 and may house a motor and/or a transmission (not shown) for driving central hub 202 in rotation about mast axis 204. Alternatively, the motor and transmission may be housed within fuselage 102 and a driveshaft (not shown) may extend down first and/or second sets of wings 112, 114 and through hub support members 230 for driving central hub 202 in rotation. In addition, central hub case 232 may house a control system (not shown) for collective and cyclic control of the pitch of each of rotor blades 206. The control system may comprise, for example, a swash plate assembly.

Outer ring 220 encircles inner ring 218 when tiltrotor assembly 200 is in the hover position. Outer ring 220 includes an interior surface 234 generally facing inner ring 218, an exterior edge 236 opposite interior surface 234, and a width measured from interior surface 234 to exterior edge 236. Outer ring 220 further includes an upper surface 238. Upper surface 238 is preferably convex from interior surface 234 extending radially outward. Outer ring 220 further includes a lower surface 240 opposite upper surface 238 and a height measured therebetween. The height and width of outer ring 220 is preferably greater than the height and width of inner ring 218. When tiltrotor assembly 200 is in the hover position, upper surface 238 of outer ring 220 and top surface 226 of inner ring 218 form a smooth, substantially continuous, surface across which air may freely flow toward rotor blades 206. Accordingly, the gap between inner ring 218 and outer ring 220 should be made as small as practicable, thereby limiting airflow interruption at the gap, maintaining the velocity of the air, and optimizing the hover efficiency provided by segmented duct 216. A brush seal can be placed between the inner and outer duct rings to prevent air flowing through the gap. In furtherance of minimizing the gap between inner ring 218 and outer ring 220, interior surface 234 may be concave from upper surface 238 to lower surface 240. The curvature of interior surface 234 preferably complimenting the curvature of outer surface 224 of inner ring 218.

As discussed above, tiltrotor assembly 200 is configured to provide aircraft 100 with VTOL capabilities, referred to herein as hover mode. This occurs when central hub 202 and inner ring 218 are in a generally horizontal position as shown in FIGS. 1-4, 6, 8, and 9, referred to herein as hover position. In the hover position, rotor blades 206 rotate in a generally horizontal plane and provide lift. After takeoff, aircraft 100 may convert to forward-flight mode by rotating central hub 202 and inner ring 218 approximately 90 degrees forward about a tilt axis 242 into a generally vertical position, referred to herein as forward-flight position. In the forward-flight position, rotor blades 206 rotate in a generally vertical plane and provide forward thrust while first and second sets of wings 112, 114 provide lift.

While maneuverability of aircraft 100 is largely facilitated by control surfaces 116 and rudder 120 in forward-flight mode, maneuverability of aircraft 100 during hover mode may be accomplished in several different ways. First, as mentioned above, tiltrotor assemblies 200 may include a control system for collective and cyclic control of the pitch of each of rotor blades 206, such as a swash plate assembly. In this configuration, aircraft 100 may utilize cyclic control of the pair of tiltrotor assemblies 200 to translate, pitch, roll, and/or yaw of aircraft 100. Second, central hub 202 of each tiltrotor assembly 200 may rotate about tilt axis 242 independent of one another and may rotate about tilt axis 242 at least several degrees in a direction opposite of the forward-flight position. In this configuration, aircraft 100 may fly forward at low speed by tilting both central hubs 202 a few degrees forward, backward by tilting both central hubs 202 a few degrees backward, and may yaw by varying the degree of rotation of both central hubs 202 about tilt axis 242. Tiltrotor assemblies 200 may utilize a combination of the control system and rotatability about tilt axis 242 to provide maneuverability in hover mode. Additional maneuverability may be accomplished by allowing central hubs 202 to also rotate about a second tilt axis 244, wherein second tilt axis 244 is generally perpendicular to mast axis 204 and tilt axis 242. Rotation of central hubs 202 about second tilt axes 244 would enable aircraft 100 to move laterally without the need for the control system providing cyclic control of the pitch of the rotor blades 206. Roll control can be achieved by differential thrust applied to the rotor systems.

As mentioned above, it is desirable to minimize airflow disturbance as the air moves toward rotor blades 206 and passes from outer ring 220 to inner ring 218. As such, inner ring 218 and outer ring 220 may both rotate together with central hub 202 several degrees in either direction about tilt axis 242, as well as second tilt axis 244. Such a configuration would maintain the smooth, substantially continuous, surface along the top of segmented duct 216 even while central hubs 202 are being tilted to cause movement of aircraft 100 while in hover mode, thereby maintaining an increased level of hover efficiency during low speed hover mode maneuvers. Alternatively, the cyclic control of rotor blades 206 (with subsequent rotor flapping) could be used to permit inner and outer rings 218, 220 to remain stationary while allowing for low speed maneuverability in hover mode.

Another feature of tiltrotor assembly 200 included to increase the hover efficiency thereof is a diffuser 246 extending from lower surface 240 of outer ring 220. Diffuser 246 may include a diffuser surface 248 extending from lower surface 240 of outer ring 220 at the junction with interior surface 234. Diffuser 246 may further include a wing attachment surface 250 opposite diffuser surface 248, a superior surface 252 configured to be coupled to lower surface 240 of outer ring 220, and an opposite inferior surface 254. Diffuser surface 248 has a length from superior surface 252 to inferior surface 254. Optimally, diffuser surface 248 should have a divergent configuration such that diffuser surface 248 diverges from mast axis 204 at about a 5 degree angle while central hub 202 is in the hover position. The optimal length of diffuser surface 248 required to maximize hover efficiency is approximately ½ to ¾ of the magnitude of rotor disc diameter 214. However, as the length of diffuser surface 248 increases, drag in forward-flight mode increases. As such, the length and angle of diffuser surface 248 will depend on a variety of factors for each particular application. Wing attachment surface 250 is configured to provide attachment locations for first and second sets of wings 112, 114. While diffuser 246 is shown and described as a separate part from outer ring 220, diffuser 246 and outer ring 220 may be a unitary structure.

Referring now to FIGS. 10-16, a tiltrotor assembly 300 is illustrated. Tiltrotor assembly 300 is substantially similar to tiltrotor assembly 200 and may be configured and function in the same manner as tiltrotor assembly 200. Tiltrotor assembly 300 includes a central hub 302 configured to rotate about a mast axis 304. Central hub 302 includes a pair of rotor blades 306 coupled thereto for common rotation therewith about mast axis 304. Each rotor blade 306 includes a root 308 coupled to central hub 302 and a tip 310 opposite root 308. A path of rotation of tip 310 defines a rotor disc perimeter 312, rotor disc perimeter 312 has a rotor disc diameter 314. Rotor disc perimeter 312 is encircled by a segmented duct 316. Segmented duct 316 includes an inner ring 318 nested inside an outer ring 320. Inner ring 318 includes an inner surface 322 facing central hub 302, an opposite outer surface 324 facing outer ring 320, and a width measured between inner surface 322 and outer surface 324. Inner ring 318 further includes a top surface 326, an opposite bottom surface 328, and a height measured therebetween. Inner ring 318 is coupled to central hub 302 via four hub support members 330. Hub support members 330 extend from inner surface 322 of inner ring 318 to a central hub case 332.

Outer ring 320 encircles inner ring 318 when tiltrotor assembly 300 is in the hover position. Outer ring 320 includes an interior surface 334 generally facing inner ring 318, an exterior edge 336 opposite interior surface 334, and a width measured from interior surface 334 to exterior edge 336. Outer ring 320 further includes an upper surface 338, an opposite lower surface 340, and a height measured therebetween. Tiltrotor assembly 300 may be attached to a wing or wings of an aircraft by attaching the wing or wings to exterior edge 336.

Under certain circumstances, it may be desirable to include increased hover efficiency provided by tiltrotor assemblies 200, 300 but omit any duct encircling rotor blades 206, 306 in the forward-flight position. As such, tiltrotor assemblies 200, 300 may omit segmented ducts 216, 316 in favor of a unitary rotor duct. The unitary rotor duct includes a central longitudinal axis that is coincident to mast axis 204, 304 when central hub 202, 302 is in hover position. The unitary rotor duct has an inner perimeter in a plane perpendicular to the central longitudinal axis, an outer perimeter in a plane perpendicular to the central longitudinal axis, and a width measured as the shortest distance between the inner perimeter and the outer perimeter. The inner perimeter of the unitary rotor duct has a diameter that is within 2 percent of the magnitude of rotor disc diameter 214, 314.

In addition, while shown as symmetric in the figures, the rotor ducts described herein may be shaped asymmetrically in order to minimize drag in forward-flight mode. Moreover, while shown attached to the distal end of a fixed wing, the rotor ducts described herein could be imbedded within the body of the wing such that rotor duct is proximate the fuselage and the fixed wing extends beyond the rotor duct.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:
1. A tiltrotor assembly, comprising:
  a central hub configured to rotate about a mast axis, the central hub also being configured to rotate about a tilt axis between a hover position and a forward-flight position, the tilt axis being generally perpendicular to the mast axis;
a plurality of rotor blades, each of the plurality of rotor blades including a root coupled to the central hub and a tip opposite the root, the plurality of rotor blades being configured to rotate with the central hub about the mast axis, a path of rotation of the tips of the plurality of rotor blades defining a rotor disc perimeter; and
a segmented duct, comprising:
an inner ring encircling the rotor disc perimeter, the inner ring including an inner surface facing the central hub, an opposite outer surface, a width extending from the inner surface to the outer surface, a top surface, a bottom surface, and a height extending from the top surface to the bottom surface, the inner ring being coupled to the central hub via a hub support member, and the inner ring being configured to rotate with the central hub about the tilt axis between the hover position and the forward-flight position; and
an outer ring including an interior surface generally facing the inner ring, an exterior edge opposite the interior surface, a width extending from the interior surface to the exterior edge, an upper surface, an opposite lower surface, and a height extending from the lower surface to the upper surface;
wherein the tilt axis extends through the outer ring; and
wherein a cross-sectional shape of the inner ring complements a cross-sectional shape of the outer ring to collectively form an airfoil cross-sectional shape and wherein the inner ring comprises a substantially cylindrical ring-shaped surface facing a substantially cylindrical ring-shaped surface of the outer ring.

2. The tiltrotor assembly of claim 1, wherein the top surface of the inner ring is convex from the inner surface to the outer surface and at least a portion of the upper surface of the outer ring is convex from the interior surface extending radially outward.

3. The tiltrotor assembly of claim 2, wherein the top surface of the inner ring and the upper surface of outer ring form a substantially continuous surface when the inner ring is in the hover position.

4. The tiltrotor assembly of claim 3, wherein the width of the outer ring is greater than the width of the inner ring.

5. The tiltrotor assembly of claim 4, wherein the outer surface of the inner ring is convex from the top surface to the bottom surface and the interior surface of the outer ring is concave from the upper surface to the lower surface.

6. The tiltrotor assembly of claim 5, wherein the height of the outer ring is greater than the height of the inner ring.

7. The tiltrotor assembly of claim 6, further comprising:
a diffuser surface extending from the inner surface of the outer ring.

8. A tiltrotor assembly, comprising:
a central hub within an inner ring configured to rotate about a mast axis, the central hub and the inner ring being configured to rotate about a tilt axis between a hover position and a forward-flight position, the tilt axis being generally perpendicular to the mast axis;
a plurality of rotor blades coupled to the central hub for common rotation therewith about the mast axis, each of the plurality of rotor blades including a tip opposite the central hub, a path of rotation of the tips of the plurality of rotor blades defining a rotor disc diameter; and a rotor duct having a generally elliptical torus shape, a central longitudinal axis that is coincident to the mast axis when the central hub is in the hover position, an inner perimeter in a plane perpendicular to the central longitudinal axis, an outer perimeter in a plane perpendicular to the central longitudinal axis, and a width measured as a shortest distance between the inner perimeter and the outer perimeter, wherein the inner perimeter of the rotor duct having a diameter that is within 2 percent of a magnitude of the rotor disc diameter;
wherein the tilt axis extends through the outer ring; and
wherein a cross-sectional shape of the inner ring complements a cross-sectional shape of the outer ring to collectively form an airfoil cross-sectional shape and wherein the inner ring comprises a substantially cylindrical ring-shaped surface facing a substantially cylindrical ring-shaped surface of the outer ring.

9. The tiltrotor assembly of claim 8, wherein the central hub is configured to rotate about the tilt axis several degrees in a direction opposite from the forward-flight position.

10. The tiltrotor assembly of claim 9, wherein the rotor duct may rotate with the central hub about the tilt axis several degrees in either direction.

11. The tiltrotor assembly of claim 9, wherein the central hub is configured to rotate about a second tilt axis which is perpendicular to the tilt axis and the mast axis.

12. The tiltrotor assembly of claim 11, wherein the rotor duct is configured to rotate with the central hub about the second tilt axis several degrees in either direction.

13. The tiltrotor assembly of claim 8, further comprising:
a control system for collective and cyclic control of a pitch of each of the plurality of rotor blades.

14. An aircraft having a hover mode and a forward-flight mode, comprising:
a fuselage having a front end, an opposite rear end, a top portion, and an opposite bottom portion;
a first set of wings extending bilaterally from the fuselage; and
a pair of tiltrotor assemblies coupled to the first set of wings, each of the tiltrotor assemblies comprising:
a central hub configured to rotate about a mast axis, the central hub also being configured to rotate about a tilt axis between a hover position and a forward-flight position, the tilt axis being generally perpendicular to the mast axis;
a plurality of rotor blades, each of the plurality of rotor blades including a root coupled to the central hub and a tip opposite the root, the plurality of rotor blades being configured to rotate with the central hub about the mast axis, a path of rotation of the tips of the plurality of rotor blades defining a rotor disc perimeter; and
a segmented duct, comprising:
an inner ring encircling the rotor disc perimeter, the inner ring including an inner surface facing the central hub, an opposite outer surface, a width extending from the inner surface to the outer surface, a top surface, a bottom surface, and a height extending from the top surface to the bottom surface, the inner ring being coupled to the central hub via a hub support member, and the inner ring being configured to rotate with the central hub about the tilt axis between the hover position and the forward-flight position; and an outer ring including an interior surface generally facing the inner ring, an exterior edge opposite the interior surface, a width extending from the interior surface to the exterior edge, an upper surface, an opposite lower surface, and a height extending from the lower surface to the upper surface;

wherein a cross-sectional shape of the inner ring complements a cross-sectional shape of the outer ring to collectively form an airfoil cross-sectional shape and wherein the inner ring comprises a substantially cylindrical ring-shaped surface facing a substantially cylindrical ring-shaped surface of the outer ring.

15. The aircraft of claim 14, wherein the top surface of the inner ring is convex from the inner surface to the outer surface, the upper surface of the outer ring adjacent to the interior surface is convex, and the top surface of the inner ring and the upper surface of outer ring form a substantially continuous surface when the inner ring is in the hover position, and the width of the outer ring is greater than the width of the inner ring.

16. The aircraft of claim 15, further comprising:
a second set of wings extending bilaterally from the fuselage, wherein the first set of wings extends from proximate the front end of the aircraft and is angled toward the rear end and the second set of wings extends from the proximate the rear end and is angled toward the front end, and ends of the first and second sets of wings are coupled to the pair of tiltrotor assemblies.

17. The aircraft of claim 16, wherein the first set of wings extends from the bottom portion of the fuselage and the second set of wings extends from the top portion of the fuselage.

18. The aircraft of claim 17, further comprising:
control surfaces on the first and second sets of wings.

19. The aircraft of claim 18, further comprising:
a vertical tail fin extending from the top portion proximate the rear end of the fuselage.

20. The aircraft of claim 19, each of the pair of tiltrotor assemblies further comprising:
a control system for collective and cyclic control of a pitch of each of the plurality of rotor blades.

* * * * *